Sept. 13, 1966   N. HOROWITZ ETAL   3,271,859
DENTAL EQUIPMENT STAND
Filed Sept. 7, 1962   2 Sheets-Sheet 1
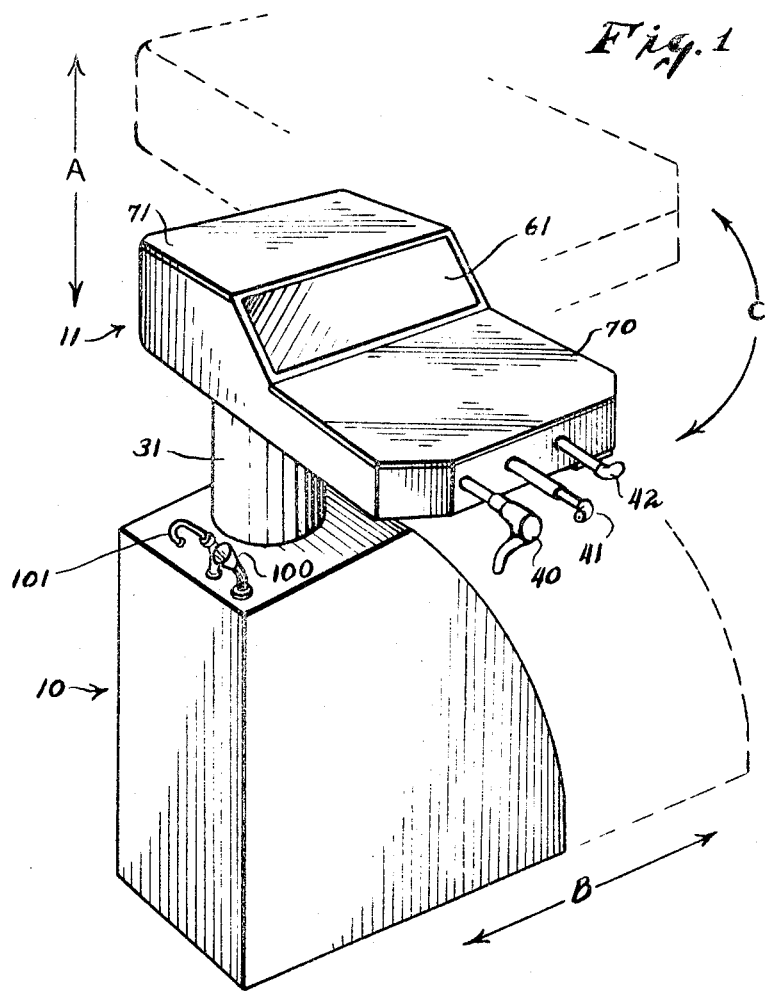
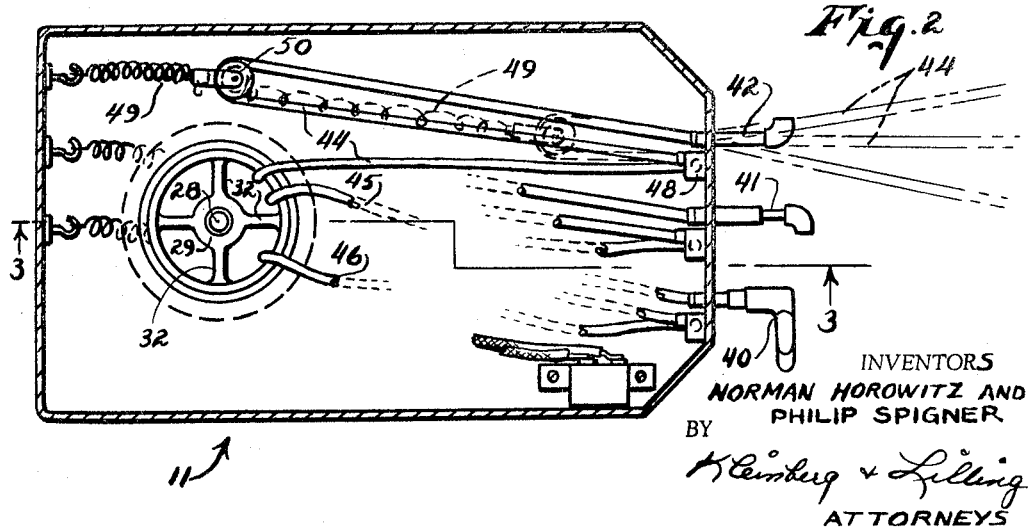
INVENTORS
NORMAN HOROWITZ AND
PHILIP SPIGNER
BY
Kleinberg & Lilling
ATTORNEYS INVENTORS
NORMAN HOROWITZ AND
PHILIP SPIGNER
BY
Kleinberg & Lilling
ATTORNEYS

3,271,859
DENTAL EQUIPMENT STAND
Norman Horowitz, 111—21 77th Road, Forest Hills, N.Y., and Philip Spigner, 1460 Park St., Atlantic Beach, N.Y.
Filed Sept. 7, 1962, Ser. No. 222,127
3 Claims. (Cl. 32—22)

This invention is concerned generally with the dental equipment stand or housing art; more particularly, it describes a stand or housing for dental use that will lend itself to improved dental operating procedures; and especially sets forth a dental stand or housing having universal mobility.

Conventional standards utilized by dental practitioners suffer from many disadvantages. Generally such equipment will include a plurality of swinging arms with dental tools operably fastened at the ends thereof. The said tools may then be urged together with their arms in proximity, and generally over, the patient.

The cumbersome nature and complexity of this equipment necessitates that it be permanently mounted in one position adjacent the dental chair. Of necessity, this will not be convenient for all positions of the dental practitioners. This is especially so in view of the trend for the dental practitioner to be seated while operating and in further view of the new styles of dental chairs available.

Additionally, it has been noted that the conventional dental stand and equipment, having many protruding arms, pulleys and tools, creates a disturbed impression upon certain patients, especially younger patients.

It is a cardinal object of this invention, therefore, to provide a universally acceptable equipment stand or housing for medical work, such as the practice of dentistry.

It is another primary object of the invention described herein to provide a dental equipment stand or housing that may be manually or automatically moved to a convenient position for the dental practitioner.

Another object of the instant invention is the provision of an equipment stand or housing for a dentist's office that will be more pleasing to the eye and that will avoid any undesirable mental images.

An ancillary object and accomplishment hereof is the provision of a dental equipment stand that will be efficient, durable and easy to repair, while being economical to produce.

In summary, the invention consists of an equipment stand with an upper or head portion that may be activated in a vertical or horizontal direction and that may be rotated about a vertical axis.

With these objects in view, the invention consists of the novel features of construction and arrangement of parts which will appear in the following specification and recited in the appended claims, reference being had to the accompanying drawings in which the same reference numerals indicate the same parts throughout the various figures and in which:

FIG. 1 is a view in perspective of one embodiment of the instant invention illustrating possible movements of the base and head portions of the stand in phantom.

FIG. 2 is a sectional plan view taken through the head of the stand substantially along line 2—2 of FIG. 3.

Figure 3:
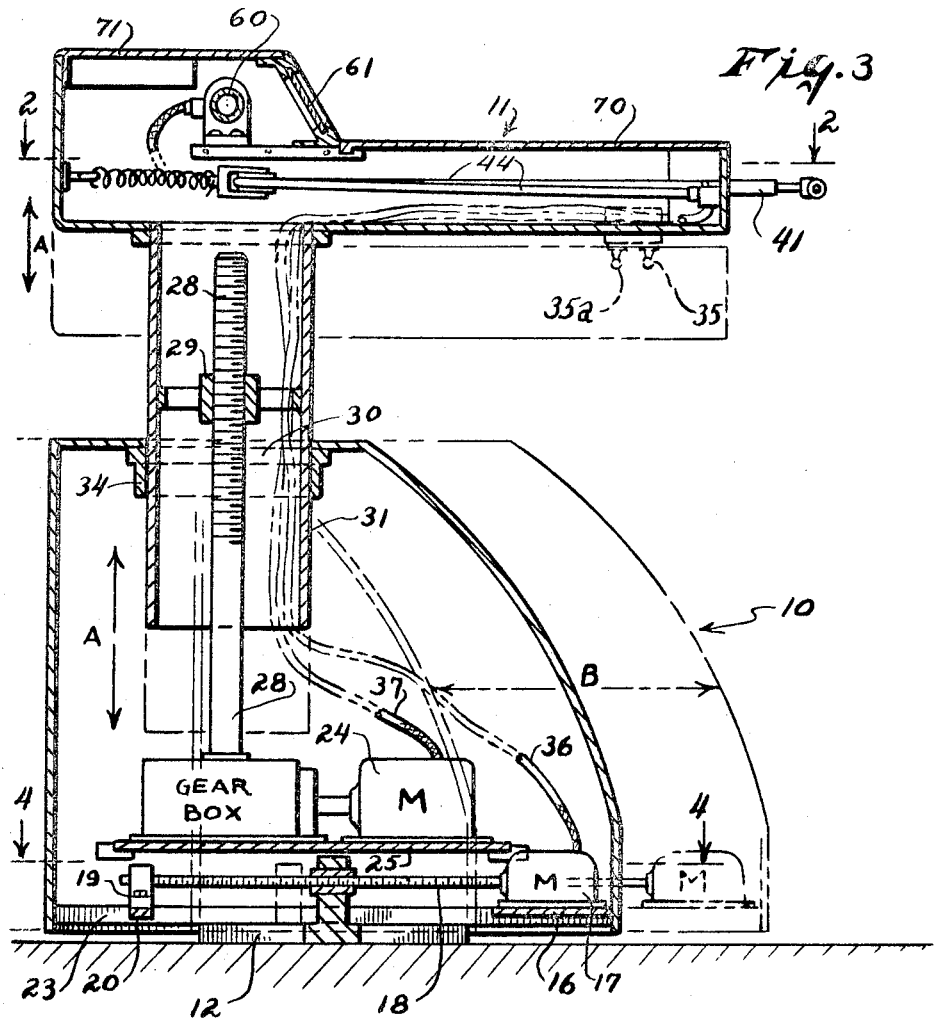
FIG. 3 is a sectional elevational view taken substantially through the center of the stand and along line 3—3 of FIG. 2, and illustrating possible movements of the base and head portions of the stand in phantom.

Referring to the drawings, which illustrate what may be for some purposes a preferred embodiment of the invention there is illustrated generally an equipment stand for certain medical work.

It is to be noted that the particular dental equipment and tools illustrated in the drawings is merely for exemplary purposes since their form is of standard construction and forms no part of the present invention. Any well-known or special types of medical equipment may be substituted therefor, or added thereto for any particular purpose.

The stand consists essentially of a base portion 10 and a head portion 11. As will be described in detail hereinafter, the base portion 10 is adapted for horizontal movement relative to the ground (along direction indicated B of FIGS. 1 and 3) and the head portion 11 is mounted for vertical and rotative movement (as indicated by A and C in FIGS. 2 and 3).

The base 10 will consist of an enclosed hollow frame or housing with one or more walls thereof connected with means for quick removal. This will lend itself to the repair, replacement or inspection of any of the internal workings of the device located within the said base portion 10.

Figure 4:
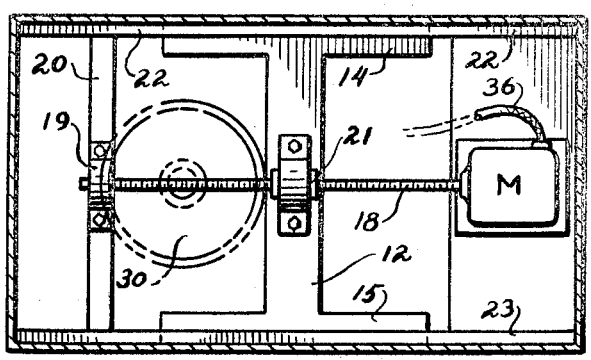
FIG. 4 is a sectional elevational view taken substantially along line 4—4 of FIG. 3.

Disposed at the bottom of the base portion 10 will be a stationary platform 12 resting upon the ground as seen in FIGS. 3 and 4. The platform 12 may have horizontal side rails 14 and 15 for stabilization purposes and to guide the movement of the base 10 to be described hereinafter.

On a shelf 16 at substantially the bottom of the base portion 10 will be an electrically actuated start-stop reversible motor 17. Extending horizontally from the said motor 17 along the longitudinal axis of the base portion 10 will be an externally threaded worm gear 18 mounted directly or through a gear box for rotation by the motor 17. Preferably, the external end of the worm gear 18 may be supported by a bushing 19 rigidly fastened to a support 20 adjacent the bottom and fastened to the base portion 10.

A rider gear 21 will be matingly threaded with the worm gear 18 and will be rigidly attached to the stationary platform 12. Thus, any rotation of the worm gear 18 by the motor 17 will cause relative movement of the rider gear 21 in the direction of the axis of the worm gear 18. In that the rider gear 21 is fastened to the stationary platform 12, and therefore cannot move, the worm gear 18, motor 17 and the base portion 10 connected thereto, will move in a direction as shown by B and the phantom positions in FIGS. 1 and 3.

In order to insure stability of the base portion 10 relative to the stationary platform 12, the base portion 10 will be provided with guides 22 and 23 partially overlying and resting against the stationary platform horizontal side rails 14 and 15. Thus, the weight of the entire unit is supported by the said side rails 14 and 15 while the worm gear 18 and the rider gear 21 provide the axial movement.

Positioned on shelves 25 located centrally of the hollow base portion 10, will be a second electrically actuated start-stop reversible motor 24. The said motor 24 will be coupled as though a gear box 26 to a vertically extending worm gear 28. Thus, any actuation of the motor 24 will result in rotative movement of the vertically extending worm gear 28. A second rider gear 29 will be threadingly secured to the vertically extending worm gear 28. Thus, the rotation of the vertically extending worm gear 28 will result in vertical movement of the second rider gear 29 and the parts fastened thereto.

An opening 30 will be provided disposed at the top of the base portion 10. The vertically extending worm gear 28 will extend centrally of the said opening 30. A lower pedestal 31 of the head portion 11 will extend downwardly through the opening 30 into the interior of the base portion 10. The second rider gear 29 will be rigidly secured as by arms 32 to the interior of the pedestal 31. A suitable collar 34 may be provided within the base portion 10 to guide the movement of the pedestal 31.

Any rotation of the vertically extending worm gear 28 will cause the pedestal 31 and the remaining parts of the head portion 11 to vertically rise or fall a predetermined amount. This movement is illustrated by A in phantom in FIGS. 1 and 3.

Still further, in that the head portion 11 is coupled to the base portion 10 only through the rider gear 29 and the worm gear 28, the head portion will be free to rotate as by manual operation about the vertical axis of the worm gear 28. This movement is illustrated in phantom and at C in FIG. 1.

Thus it is that the head portion 11 of the unit may be moved to various positions. If the base portion 10 is mounted adjacent a dental operating chair, the head portion 11 may be moved to various positions adjacent the chair to bring dental instruments within easy reach of the medical practitioner and in close proximity to the patient. The head may be raised or lowered, may be rotated horizontally or may be moved horizontally, as by moving the base portion 10. This will enable a doctor to operate from any position, including a sitting position, without recourse to an assistant or extensive reaching.

The operation of the motors 17 and 24 may be controlled through suitable switches 35 and 35a mounted on any convenient position of the head portion 11. The switches 35 and 35a may be coupled to the motors 17 and 24 through electric wires 36 and 37 extending through the hollow pedestal 31. Thus the dentist, by merely actuating switches 34 and 35, can cause elevational or horizontal movement of the unit.

Of course, a group of dental accessories will be provided conveniently at the head portion 11. Such dental accessories or tools are illustrated at 40, 41 and 42. Certain of the tools, such as an air drill, will require an air hose leading thereto. Other tools may require water tubing or electric cords, or the like. When in operation, it will be required to withdraw the tool along with a portion of its tubing from the head portion 11, for use. This is accomplished herein, by a completely novel, unique and efficient method.

Air, electricity or water for the various tubes is provided by hosing through the base portion 10. The hosing 44, 45 and 46 will be conducted up through the pedestal 31.

The operation of one of the tools 42 and its hose 44 will be described in particular hereinafter. It will be understood, however, that the operation of the other tools and hosing will be the same as described. The hose 44 is conducted upwards from the base portion 10 through the pedestal 31 with sufficient slack to accommodate any rise or fall of the head portion 11 relative to the base portion 10 as heretofore described. The hose 44 will be conducted to the forward end of the head portion 11 where it will be fastened by a suitable bracket 48. The hose 44 will then be conducted around a pulley 50 held by a spring 49 adjacent the rear of the head portion 11. The forward end of the tubing 44 will then be returned through the forward wall of the head portion to be connected to the dental tool 42. When it is desired to activate the dental tool 42 and utilize it, as during an operation, it may be removed, together with a portion of the hose 44 from the head portion 11 as shown in phantom in FIG. 2. This will be accomplished against the resistance of the spring 49 urging the pulley 50 towards the rear wall of the head portion 11.

As the tool 42 is removed, the pulley 50 will approach the forward wall of the head portion 11 as shown in phantom in FIG. 3 and the spring 49 will extend. This unique pulley arrangement permits the dental tools to be easily extended when desired. The springs, however, will cause the tools to be returned into the head when they are released.

Other and varied dental implements and accessories may be situated within the head portion 11 as desired. For example, a light 60 and a viewing glass 61 may be provided for X-ray viewing.

In the preferred embodiment of the invention, the head portion 11 will have two upper surfaces 70 and 71. Surface 70 may function as a tray for other instruments of the medical practitioner and surface 71 may serve a similar function for a medical assistant.

Other instruments, such as burners, etc., may be positioned in the head. Air, gas and electrical controls and valves may be situated in the base.

The base portion 10 may further contain tubing for a suction device 100, and saliva ejector 101 connected inside, to a conventional vacuum or water outlet. If the unit is positioned properly for the medical practitioner, the suction devices will be convenient for the patient.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein, or required by the prior art.

Having thus described our invention, and illustrated its use, what we claim as new and desire to secure by Letters Patent is:

1. A dental equipment stand comprised of a base portion, a head portion mounted on said base portion to receive the dental equipment, said head portion having a pedestal extending therebelow fitting within a collar at the top of said base portion, first means in association with said base portion to move said base portion in a substantially horizontal plane, and second means in cooperative association with said base portion and said pedestal of said head portion to vertically move said head portion relative to said base portion, wherein said first means includes a stand within said base portion resting on the ground, the remainder of said base portion resting on said stand, and motor means within said base portion, actuating connections between said motor means and said stand, said motor means and said actuating connections effecting movements relative between said stand and said base portion, and switch means on said head portion for energizing said motor means.

2. A dental equipment stand comprised of a base portion, a head portion mounted on said base portion to receive the dental equipment, said head portion having a pedestal extending therebelow fitting within a collar at the top of said base portion, first means in association with said base portion to move said base portion in a substantially horizontal plane, and second means in cooperative association with said base portion and said pedestal of said head portion to vertically move said head portion relative to said base portion, further including motor means in said base portion as part of said second means, said motor means having an actuating connection alternately raising and lowering said pedestal of said head portion, and manually operable switch means on said head portion for energizing said motor means, said first means including a stand within said base portion resting on the ground, the remainder of said base portion resting on said stand, and second motor means within said base portion, second actuating connections between said second motor means and said stand, said second motor means and said second actuating connections effecting movements relative between said stand and said base portion, and second switch means on said head portion for energizing said second motor means.

3. A dental equipment stand as set forth in claim 1 further including dental instruments detachably secured to said head portion, and at least one conduit extending through said pedestal and said base portion and connected to said dental instruments.

References Cited by the Examiner
UNITED STATES PATENTS

| | | | |
|---|---|---|---|
| 2,065,952 | 12/1936 | Trautmann | 108—147 X |
| 2,351,943 | 6/1944 | Ebbers et al. | 32—22 |
| 3,085,338 | 4/1963 | Patzold et al. | 32—22 |

RICHARD A. GAUDET, *Primary Examiner.*

ROBERT E. MORGAN, *Assistant Examiner.*